US012083987B2

United States Patent
Song et al.

(10) Patent No.: US 12,083,987 B2
(45) Date of Patent: Sep. 10, 2024

(54) EXTERNAL AIRBAG DEVICE

(71) Applicant: HYUNDAI MOBIS CO., LTD., Seoul (KR)

(72) Inventors: Jiwoon Song, Yongin-si (KR); Sang Won Hwangbo, Yongin-Si (KR); Do Hyoung Kim, Yongin-si (KR); Seok Min Lee, Yongin-si (KR); Jae Jun Harm, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 343 days.

(21) Appl. No.: 17/476,603

(22) Filed: Sep. 16, 2021

(65) Prior Publication Data

US 2022/0118938 A1 Apr. 21, 2022

(30) Foreign Application Priority Data

Oct. 20, 2020 (KR) .......................... 10-2020-0136209

(51) Int. Cl.
 *B60R 21/36* (2011.01)
 *B60R 19/48* (2006.01)

(52) U.S. Cl.
 CPC .............. *B60R 21/36* (2013.01); *B60R 19/48* (2013.01)

(58) Field of Classification Search
 CPC ........ B60R 2021/346; B60R 2021/343; B60R 2021/237; B60R 21/36; B60R 21/34; B60R 21/38; B60R 19/205
 See application file for complete search history.

(56) References Cited

U.S. PATENT DOCUMENTS

| | | | | |
|---|---|---|---|---|
| 3,588,142 A | * | 6/1971 | Gorman | B60R 21/232 293/109 |
| 3,656,790 A | * | 4/1972 | Truesdell | B60R 19/205 293/142 |
| 3,822,076 A | * | 7/1974 | Mercier | B60R 19/205 180/274 |
| 5,033,569 A | * | 7/1991 | Hayes | B60R 19/205 293/118 |
| 5,106,137 A | * | 4/1992 | Curtis | B60R 19/205 293/109 |
| 5,725,265 A | * | 3/1998 | Baber | B60R 19/205 293/107 |
| 5,959,552 A | * | 9/1999 | Cho | B60R 21/013 340/904 |

(Continued)

FOREIGN PATENT DOCUMENTS

| | | | | |
|---|---|---|---|---|
| DE | 10121630 A1 | * | 11/2002 | .......... B60R 19/205 |
| JP | H1191503 A | * | 4/1999 | |

(Continued)

*Primary Examiner* — Emma K Frick
(74) *Attorney, Agent, or Firm* — NovoTechIP International PLLC

(57) ABSTRACT

An external airbag device is proposed. The external airbag device includes: a housing located in a bumper and securely coupled to a vehicle; and an airbag cushion disposed inside the housing in a folded state, and configured to be deployed outwardly from the housing and the bumper when gas is injected thereinto, wherein the airbag cushion is configured to be deployed to be inclined while a contact surface thereof brought into contact with an external obstacle colliding with the vehicle is deployed.

7 Claims, 6 Drawing Sheets

(56) References Cited

U.S. PATENT DOCUMENTS

| | | | | |
|---|---|---|---|---|
| 6,106,038 | A * | 8/2000 | Dreher | B60T 7/22 293/118 |
| 6,227,325 | B1 * | 5/2001 | Shah | B64C 25/56 180/274 |
| 6,450,556 | B1 * | 9/2002 | Jacobs | B60R 19/205 180/274 |
| 6,497,183 | B2 * | 12/2002 | Demarquilly | B61D 15/06 105/392.5 |
| 6,637,788 | B1 * | 10/2003 | Zollner | B60R 19/205 280/728.1 |
| 6,920,954 | B2 * | 7/2005 | Hashimoto | B60R 21/2155 180/274 |
| 6,923,483 | B2 * | 8/2005 | Curry | B60R 19/205 180/274 |
| 7,000,725 | B2 * | 2/2006 | Sato | B60R 21/36 180/274 |
| 7,036,844 | B2 * | 5/2006 | Hammer | B60R 21/36 280/743.1 |
| 7,073,619 | B2 * | 7/2006 | Alexander | B60R 21/36 180/274 |
| 7,258,191 | B1 * | 8/2007 | Rammer | B60R 19/483 180/274 |
| 7,753,159 | B2 * | 7/2010 | Kim | B60R 21/36 180/274 |
| 8,033,356 | B2 * | 10/2011 | Kim | B60R 21/36 180/274 |
| 8,662,237 | B2 * | 3/2014 | Chung | B60R 21/239 180/274 |
| 8,689,924 | B2 * | 4/2014 | Okamoto | B60R 21/34 180/274 |
| 8,764,062 | B2 * | 7/2014 | Chung | B60R 19/205 180/274 |
| 9,027,696 | B2 * | 5/2015 | Park | B60R 21/233 180/274 |
| 9,110,169 | B2 * | 8/2015 | Stettner | B60R 21/0134 |
| 10,124,759 | B2 * | 11/2018 | Smith | C06D 5/02 |
| 10,870,402 | B2 * | 12/2020 | Havlik | B60R 21/13 |
| 10,906,497 | B2 * | 2/2021 | Madon | B60R 21/203 |
| 10,953,844 | B2 * | 3/2021 | Farooq | B60R 21/36 |
| 10,953,845 | B2 * | 3/2021 | Nakamura | B60R 21/0134 |
| 10,988,104 | B2 * | 4/2021 | Williams | B60R 21/264 |
| 10,988,105 | B2 * | 4/2021 | Gunji | B60R 21/38 |
| 11,173,869 | B2 * | 11/2021 | Nagasawa | B60R 21/00 |
| 11,242,022 | B2 * | 2/2022 | Umezawa | B60R 21/0134 |
| 11,351,956 | B2 * | 6/2022 | Nagasawa | B60R 21/36 |
| 11,654,849 | B2 * | 5/2023 | Nagasawa | B60R 21/0134 180/271 |
| 2005/0269805 | A1 * | 12/2005 | Kalliske | B60R 21/36 180/274 |
| 2009/0102167 | A1 * | 4/2009 | Kitte | B60R 21/2338 280/743.2 |
| 2017/0182961 | A1 * | 6/2017 | Wu | B60R 21/36 |
| 2021/0276509 | A1 * | 9/2021 | Kobata | B60R 21/38 |
| 2021/0402952 | A1 * | 12/2021 | Nakamura | B60R 21/36 |
| 2022/0306025 | A1 * | 9/2022 | Nagasawa | B60R 21/0134 |
| 2022/0306030 | A1 * | 9/2022 | Nakamura | B60R 21/0134 |

FOREIGN PATENT DOCUMENTS

| | | | |
|---|---|---|---|
| KR | 20070062221 | A * | 6/2007 |
| KR | 20140085889 | A | 7/2014 |

* cited by examiner

EXTERNAL AIRBAG DEVICE

CROSS-REFERENCE TO RELATED APPLICATIONS

The present application claims priority to Korean Patent Application No. 10-2020-0136209, filed Oct. 20, 2020, the entire contents of which is incorporated herein for all purposes by this reference.

BACKGROUND OF THE INVENTION

1. Field of the Invention

The present invention relates to an external airbag device and, more particularly, to an airbag device deployed out of a vehicle during a collision of the vehicle to absorb impact energy.

2. Discussion of Related Art

A vehicle is equipped with various safety devices to protect a driver and occupants in preparation for an instantaneous unexpected situation. A representative safety device is an airbag device for directly protecting a driver and occupants seated on a vehicle seat.

When a vehicle collision occurs, in the airbag device, compressed gas is momentarily injected into an airbag by the impact force, and the airbag is rapidly inflated by the compressed gas to protect the occupants.

Recently, there is a demand for a device provided to reduce a collision injury of a pedestrian while protecting a vehicle when the vehicle collides with an obstacle or the pedestrian, and an external airbag device is one of the airbag devices.

The external airbag device reduces the impact force applied to the occupants by deploying an airbag cushion before the vehicle collision to enlarge an energy absorption space, thereby reducing external damages of the vehicle as well as occupant injuries.

The external airbag device according to the related art is provided between a bumper and a back beam, and is deployed out of the vehicle while the airbag cushion breaks the bumper from the inside of the bumper. However, the external airbag device has a problem of upward or downward separation of the airbag cushion in a deployment state.

The foregoing is intended merely to aid in the understanding of the background of the present invention, and is not intended to mean that the present invention falls within the purview of the related art that is already known to those skilled in the art.

BRIEF SUMMARY OF THE INVENTION

Accordingly, the present invention has been made keeping in mind the above problem occurring in the related art, and the present invention is intended to provide an external airbag device configured to prevent separation of an airbag cushion that is deployed during a vehicle collision.

In order to achieve the above objective, according to one aspect of the present invention, there is provided an external airbag device including: a housing located in a bumper and securely coupled to a vehicle; and an airbag cushion stored folded in the housing, and configured to deploy or expand outwardly from the housing and the bumper when gas is injected thereinto, wherein the airbag cushion is configured to inclinedly deploy or expand while a contact surface thereof brought into contact with an external obstacle colliding with the vehicle is deployed.

The airbag cushion may be configured to inclinedly deploy or expand such that the contact surface may protrude further away from the vehicle as the contact surface goes upward in the deployed state of the airbag cushion.

The airbag cushion may be configured to be brought into contact with the external obstacle starting from an upper portion of the contact surface thereof in the deployed state of the airbag cushion.

The airbag cushion may have an upper surface, which may be connected to an upper portion of the contact surface thereof and be extended in a direction of being spaced apart from the vehicle longer than a lower surface connected to a lower portion of the contact surface.

The airbag cushion may be folded such that an upper portion and a lower portion thereof may be separately folded, and the folded upper portion of the airbag cushion may be disposed above the folded lower portion thereof inside the housing.

The folded upper portion of the airbag cushion may be disposed at the position more outward than the position of the folded lower portion of the airbag cushion inside the housing.

The folded lower portion of the airbag cushion may be densely folded to have a volume smaller than a volume of the folded upper portion of the airbag cushion.

The upper portion of the airbag cushion may include an upper portion of the contact surface and the lower portion of the airbag cushion may include a lower portion of the contact surface.

The external airbag device may include an inflator disposed inside the housing and configured to inject the gas into the airbag cushion when a signal is input.

According to the present invention, the external airbag device is configured to generate the rotating force that rotates the airbag cushion upward, whereby the airbag cushion can be prevented from being separated.

Therefore, the time at which the airbag cushion absorbing impact energy can be increased and an effect of reducing the impact energy can be increased.

BRIEF DESCRIPTION OF THE DRAWINGS

The above and other objectives, features, and other advantages of the present invention will be more clearly understood from the following detailed description when taken in conjunction with the accompanying drawings, in which.

DETAILED DESCRIPTION OF THE INVENTION

Figure 1:
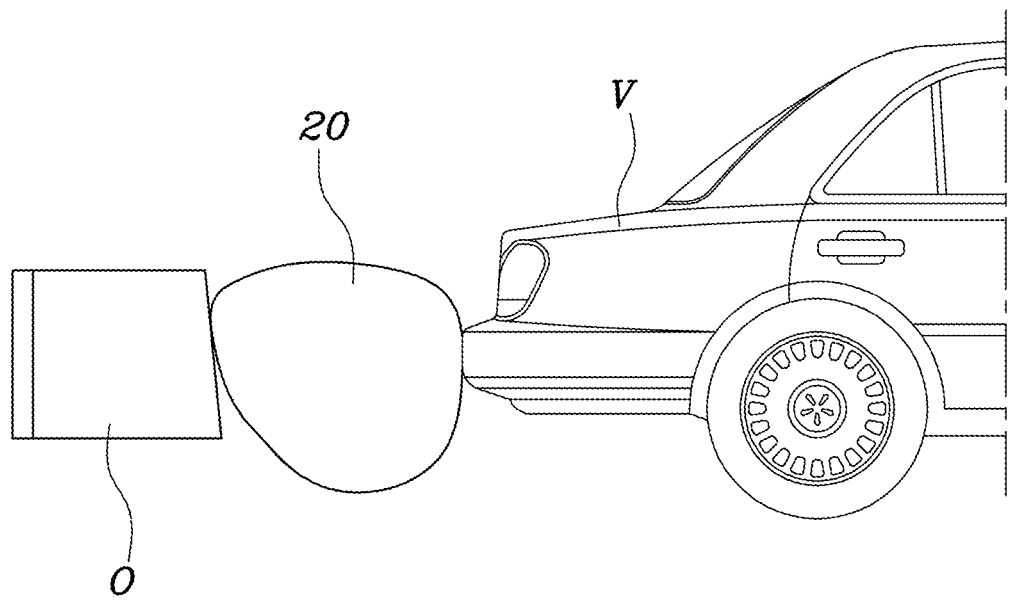
FIG. 1 is a view showing a deployed external airbag device of a vehicle according to an embodiment of the present invention.

In the following description, the structural or functional description specified to exemplary embodiments according to the concept of the present invention is intended to describe the exemplary embodiments, so it should be understood that the present invention may be variously embodied, without being limited to the exemplary embodiments.

Embodiments described herein may be changed in various ways and various shapes, so specific embodiments are shown in the drawings and will be described in detail in this specification. However, it should be understood that the exemplary embodiments according to the concept of the present invention are not limited to the embodiments which will be described hereinbelow with reference to the accompanying drawings, but all of modifications, equivalents, and substitutions are included in the scope and spirit of the invention.

It will be understood that, although the terms first and/or second, etc. may be used herein to describe various elements, these elements should not be limited by these terms. These terms are only used to distinguish one element, from another element. For instance, a first element discussed below could be termed a second element without departing from the teachings of the present invention. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent" or "directly adjacent" should be construed in the same manner.

The terminology used herein is for the purpose of describing particular embodiments only and is not intended to limit the present invention. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which the present invention belongs. It must be understood that the terms defined by the dictionary are identical with the meanings within the context of the related art, and they should not be ideally or excessively formally defined unless the context clearly dictates otherwise.

Hereinbelow, preferred embodiments of the present invention will be described in detail with reference to accompanying drawings. Like reference numerals given in the drawings indicate like components.

Figure 2:
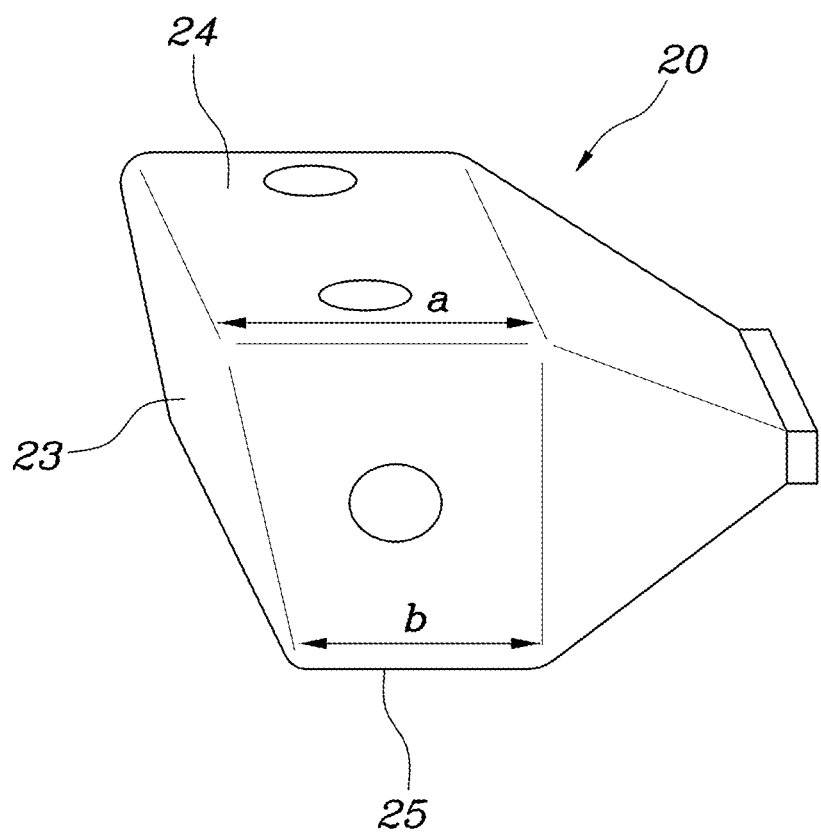
FIG. 2 is a view showing a deployed airbag cushion included in the external airbag device of a vehicle according to the embodiment of the present invention.
Figure 3:
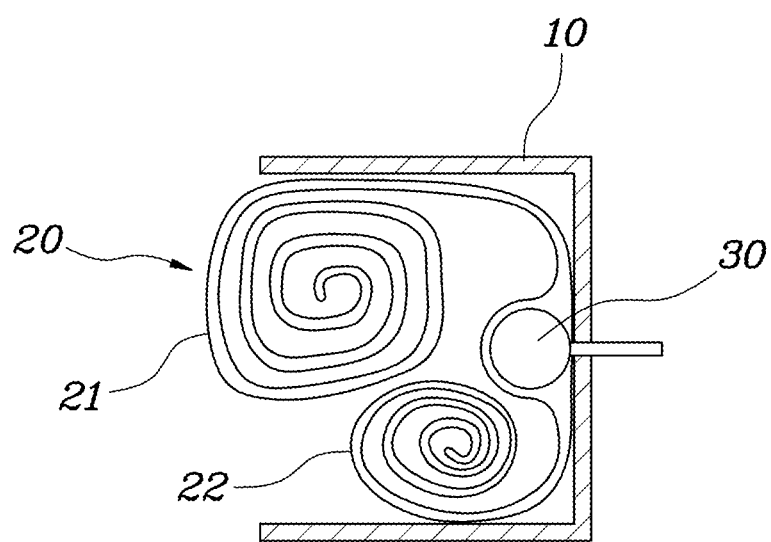
FIG. 3 is a view showing a folded external airbag device of a vehicle according to the embodiment of the present invention.

FIG. 1 is a view showing a deployed external airbag device a vehicle V according to an embodiment of the present invention. FIG. 2 is a view showing a deployed airbag cushion included in the external airbag device of a vehicle V according to the embodiment of the present invention. FIG. 3 is a view showing a folded external airbag device of a vehicle V according to the embodiment of the present invention.

Referring to FIGS. 1 to 3, the external airbag device of a vehicle V according to the embodiment of the present invention includes: a housing 10 located in a bumper and securely coupled to the vehicle V; and the airbag cushion 20 stored folded in the housing 10, and deployed out of the housing 10 and the bumper when gas is injected thereinto. The airbag cushion 20 is inclinedly deploy or expand while a contact surface 23 thereof brought into contact with an external obstacle O colliding with the vehicle V is deployed.

The housing 10 has a form extended in a transverse direction of the vehicle V, and may be located inside the bumper of the vehicle V. Specifically, the housing 10 may be fixed to a back beam of the vehicle V, and may be extended in a longitudinal direction of the vehicle between the back beam and the bumper.

The housing 10 may be located at a front end or a rear end of the vehicle V. When the housing is located at the front end of the vehicle V, the external airbag device may absorb impact energy in a forward collision of the vehicle V. When the housing is located at the rear end of the vehicle V, the external airbag device may absorb impact energy in a rear collision of the vehicle V.

The housing 10 may accommodate the folded airbag cushion 20, and the housing 10 may be opened by deployment pressure generated when the airbag cushion 20 is deployed according to operation of an inflator 30, which will be described below.

As an embodiment, the housing 10 may have a tear line or a cover (not shown), which covers an open surface of the housing 10 and opens one surface of the housing 10 while being rotated or broken.

When the inflator 30 is operated, the tear line formed on the housing 10 or the cover (not shown) is broken by the deployment pressure generated when the airbag cushion 20 is deployed, so that the airbag cushion 20 may be deployed out of the housing 10.

As another embodiment, the cover (not shown) may be coupled to the housing 10 by a hook, and the airbag cushion 20 may be deployed out of the housing 10 by separation of the hook.

As an embodiment, when the external airbag device is located at the rear end of the vehicle V, the contact surface 23 may be a rear surface of the airbag cushion 20 brought into contact with the external obstacle O that is located in rear of the vehicle during a rearward collision.

The contact surface 23 may not be formed in a perpendicular direction to the ground, but may be extended in a direction obliquely inclined to the ground.

When the airbag cushion 20 is in the deployed state, the airbag cushion 20 may be configured to be inclined such that the contact surface 23 protrudes in a direction of being spaced apart from the vehicle V as the contact surface 23 goes upward.

The contact surface 23 of the airbag cushion 20 may be inclined to protrude in the direction of being space apart from the vehicle V as the contact surface 23 goes upward, and may be inclined to be near the vehicle V as the contact surface 23 goes downward.

The airbag cushion 20 may be brought into contact with the external obstacle O starting from an upper portion of the contact surface 23 when the airbag cushion 20 is in the deployed state.

As shown in FIG. 1, when the vehicle V and the external obstacle O start to be in contact with each other, only the upper portion of the contact surface 23 is in contact with the external obstacle O. Gradually, as the external obstacle O gets closer to the vehicle, even a lower portion of the contact surface 23 may be in contact with the external obstacle O.

Therefore, the upper portion of the contact surface 23 is pressurized by initial contact with the external obstacle O. As the upper portion of the contact surface 23 is pressurized, the airbag cushion 20 may generate a rotation force rotating upward.

The airbag cushion 20 may be formed such that an upper surface 24 connected to the upper portion of the contact surface 23 may be extended in the direction of being spaced apart from the vehicle V longer than a lower surface 25 connected to the lower portion of the contact surface 23.

As an embodiment, the airbag cushion 20 may have a connection surface connecting between the contact surface 23 to be in contact with the external obstacle O and the vehicle V. The connecting surface may be extended in a pillar shape having the contact surface 23 as one surface thereof.

The contact surface 23 may have a rectangular shape, and the connecting surface may consist of the upper surface 24, the lower surface 25, and side surfaces respectively connected to upper, lower, and opposite side portions of the contact surface 23. The connecting surface may be formed of a single panel or a plurality of panels coupled to each other.

As another embodiment, in order to satisfy the shape of the airbag cushion 20 shown in the drawing may be formed by a combination of three-dimensional patterns.

As shown in FIG. 2, the upper surface 24 may be extended in a direction of being spaced apart from the vehicle V longer than the lower surface 25 (a>b). Accordingly, the contact surface 23 may be farther away from the vehicle V at the upper portion thereof, and may be brought in contact with the external obstacle O first.

Figure 4:
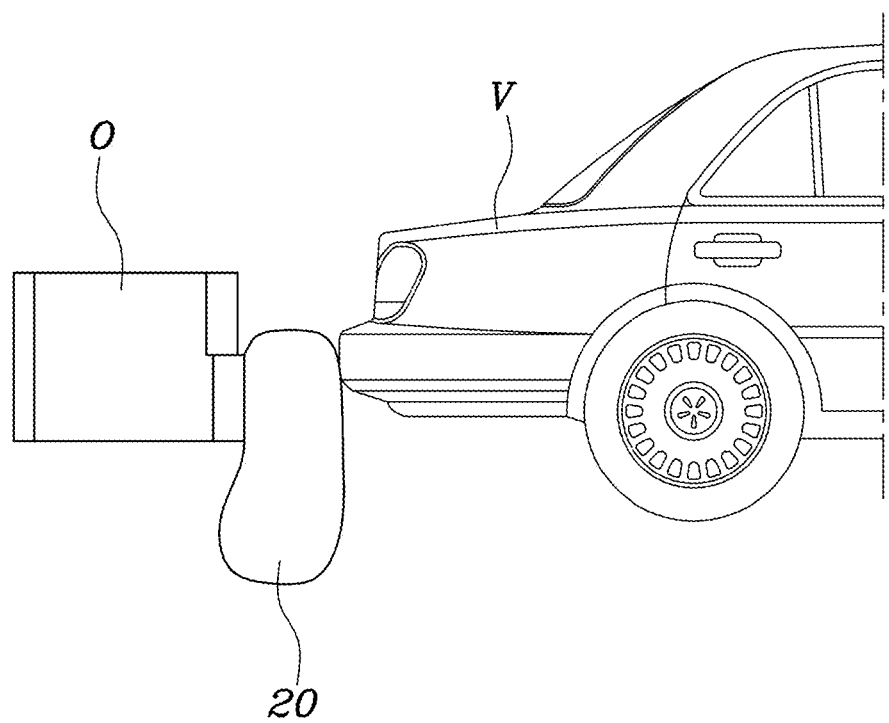
FIG. 4 is a view showing a separation state of an airbag cushion according to the related art when the airbag cushion collides with an external obstacle.
Figure 5:
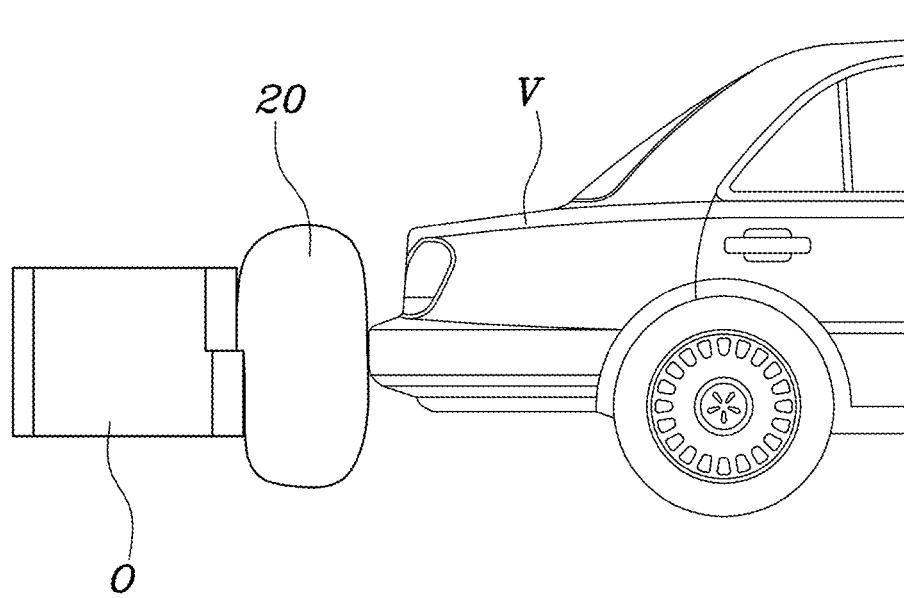
FIG. 5 is a view showing a contact state of the airbag cushion according to the embodiment of the present invention when the airbag cushion collides with the external obstacle.

FIG. 4 is a view showing a separation state of an airbag cushion 20 according to the related art when the airbag cushion 20 collides with the external obstacle O. FIG. 5 is a view showing a contact state of the airbag cushion 20 according to the embodiment of the present invention when the airbag cushion collides with the external obstacle O.

Referring to FIGS. 4 and 5, according to the related art, when the airbag cushion 20 is in the deployed state and the airbag cushion 20 collides with the external obstacle O, the airbag cushion 20 is often separated downward depending on a shape of the external obstacle O.

When the airbag cushion 20 is separated from a portion between the airbag cushion and the external obstacle O, energy absorption time may be reduced and absorption rate may be lowered.

In preparation for the above problem, according to the embodiment of the present invention, as the upper portion of the airbag cushion 20 is brought into contact with the external obstacle O first, a rotation force by which the airbag cushion 20 is rotated upward is generated, so there is an effect of preventing the airbag cushion 20 from being separated.

Figure 6:
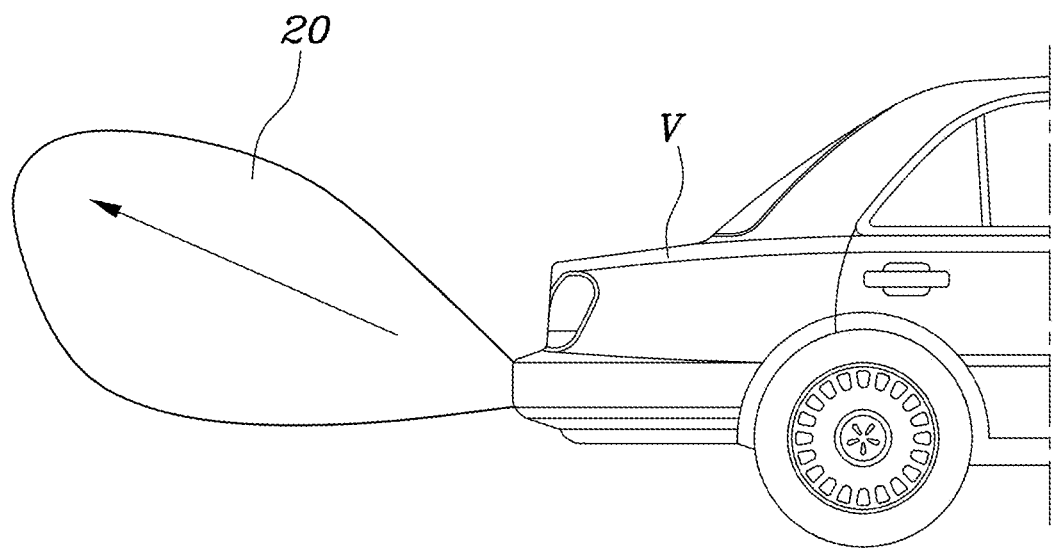
FIG. 6 is a view showing a deployed state of the airbag cushion according to the embodiment of the present invention.

FIG. 6 is a view showing a deployed state of the airbag cushion 20 according to the embodiment of the present invention.

Referring to FIGS. 3 and 6, the airbag cushion 20 is folded such that an upper portion 21 and a lower portion 22 of the airbag cushion 20 are separately folded. The folded upper portion 21 may be disposed above the folded lower portion 22 in the housing 10.

The airbag cushion 20 may be folded in a rolled state such as a scroll. The airbag cushion 20 is not folded into one scroll, but may be divided into the upper portion 21 and the lower portion 22 and the upper portion 21 and the lower portion 22 are folded, respectively.

The upper portion 21 and the lower portion 22 may be folded to each include a portion of the contact surface 23.

The upper portion 21 may include an upper portion of the contact surface 23 and the lower portion 22 may include a lower portion of the contact surface 23. The upper portion 21 may include the upper surface 24 connected to the upper portion of the contact surface and the lower portion 22 may include the lower surface 25 connected to the lower portion of the contact surface.

As an embodiment, the upper portion 21 and the lower portion 22 may be folded to be rolled in opposite directions. The upper portion 21 and the lower portion 22 may be rolled such that the upper surface 24 and the lower surface 25 of the connecting surface are located at outside portions of the folded upper portion 21 and the folded lower portion 22.

The folded upper portion 21 may be disposed closer to an opening of the housing 10 than the folded lower portion 22 is disposed.

Specifically, the folded lower portion 22 may be located at a relative inside portion in the housing 10 and the folded upper portion 21 may be located at a relative outside portion in the housing 10.

As an embodiment, when the external airbag device is located at the rear end of the vehicle V, the folded lower portion 22 may be located at a relative front portion and the folded upper portion 21 may be located at a relative rear portion. The folded upper portion 21 and the folded lower portion 22 may be disposed diagonally with each other in the housing 10.

Therefore, when the airbag cushion 20 is deployed, the upper portion 21 may be pressurized upward by deployment pressure of the lower portion 22 located at the relative inside portion in the housing 10.

As shown in FIG. 6, as the deployment pressure of the folded lower portion 22 located at the relative inside portion in the housing is applied to the housing 10, reaction may deploy the airbag cushion 20 so that the airbag cushion 20 is inclined upward.

The folded lower portion 22 may be densely folded to have a volume smaller than a volume of the folded upper portion 21.

Specifically, the lower portion 22 may be densely folded so as to secure an inside space thereof relatively small, and the upper portion 21 may be roughly folded so as to secure an inside space thereof relatively large. Therefore, the folded lower portion 22 may have a volume relatively larger (?) than a volume of the folded upper portion 21.

Therefore, the folded lower portion 22 may be deployed later than the folded upper portion 21, and the upper portion 21 is deployed more rapidly and the lower portion 22, which is deployed delayed, may push the upper portion 21 upward so that the airbag cushion 20 may be deployed upward.

The external airbag device may include the inflator 30 disposed in the housing 10, and configured to inject the gas into the airbag cushion 20 when a signal is input.

The inflator 30 may generate the gas while exploding during receiving the deployment signal of the airbag. The generated gas may be injected into the airbag cushion 20 to deploy the airbag cushion 20.

Figure 7:
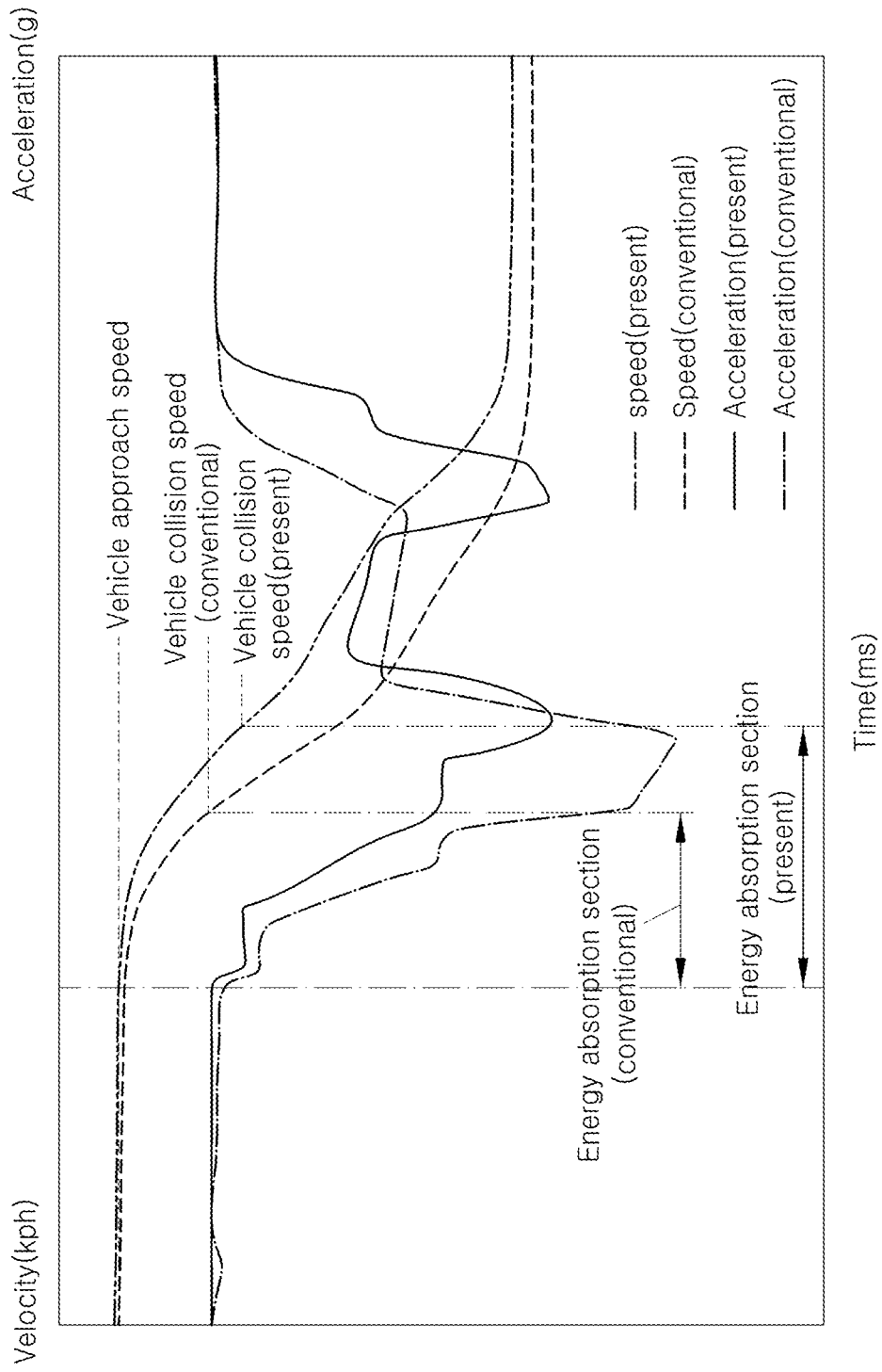
FIG. 7 is a graph showing speed and acceleration of a vehicle according to the related art and the embodiment of the present invention.

FIG. 7 is a graph showing speed and acceleration of the vehicle V according to the related art and the embodiment of the present invention.

Referring to FIG. 7, when the external airbag device according to the embodiment of the present invention is used in a vehicle, in comparison to the related art, separation of the airbag cushion 20 is prevented and thus expanding an energy absorption section due to the airbag cushion 20.

According to the present invention, a section of the time at which the airbag cushion 20 absorbs impact energy increases, whereby a speed of the vehicle V (collision speed of vehicle V) at the time at which the bumper of the vehicle V directly collides with the external obstacle O (hard contact) may be reduced.

Although the preferred embodiments of the present invention have been disclosed for illustrative purposes, those skilled in the art will appreciate that various modifications, additions and substitutions are possible, without departing from the spirit and scope of the present invention.

What is claimed is:

1. An external airbag comprising:
a housing located in a bumper of a vehicle; and
an airbag cushion stored folded in the housing and configured to expand outwardly from the housing through an airbag exit portion of the bumper when gas is injected into the airbag cushion, the airbag cushion having a contact surface configured to contact an external obstacle colliding with the vehicle when the airbag cushion is deployed,
wherein:
the airbag cushion is configured to, when deployed, extend in an upwardly inclined direction from the airbag exit portion of the bumper such that a first portion of the airbag cushion having an elevation higher than the airbag exit portion of the bumper is larger than a second portion of the airbag cushion having an elevation lower than the airbag exit portion of the bumper;
the airbag cushion stored in the housing has upper and lower portions folded separately;
the folded upper portion is located above the folded lower portion within the housing; and
the folded upper and lower portions of the airbag cushion are folded so that the folded lower portion is folded more densely than the folded upper portion is folded so that the folded lower portion has a first volume smaller than a second volume of the folded upper portion and so that the folded upper portion is deployed more rapidly than the folded lower portion when gas is injected into the airbag cushion.

2. The external airbag of claim 1, wherein:
the contact surface of the deployed airbag cushion has upper and lower portions, and
the airbag cushion is configured to deploy such that the upper portion of the contact surface protrudes farther away from the vehicle than the lower portion of the contact surface protrudes from the vehicle.

3. The external airbag of claim 2, wherein the airbag cushion is configured such that, when the airbag cushion contacts the external obstacle, the upper portion of the contact surface contacts the external obstacle prior to when the lower portion of the contact surface contacts the external obstacle.

4. The external airbag of claim 1, wherein the airbag cushion further includes:
an upper surface adjoining an upper portion of the contact surface; and
a lower surface adjoining a lower portion of the contact surface and having a length smaller than that of the upper surface.

5. The external airbag of claim 1, wherein the folded upper and lower portions are positioned within the housing such that the folded upper portion is closer to an opening of the housing than the folded lower portion is.

6. The external airbag of claim 1, wherein the upper portion of the airbag cushion includes an upper portion of the contact surface, and the lower portion of the airbag cushion includes a lower portion of the contact surface.

7. The external airbag of claim 1, further comprising an inflator positioned in the housing and configured to inject the gas into the airbag cushion in response to a signal indicating a collision of the vehicle with the external obstacle.

* * * * *